March 29, 1960 V. J. COOPER 2,930,843

COLOR TELEVISION APPARATUS

Filed March 15, 1956

INVENTOR;
Victor James Cooper
BY: Baldwin & Wight
ATTORNEYS

United States Patent Office 2,930,843

Patented Mar. 29, 1960

2,930,843

COLOR TELEVISION APPARATUS

Victor James Cooper, Chelmsford, England, assignor to Marconi's Wireless Telegraph Company Limited, London, England, a British company Application March 15, 1956, Serial No. 571,703

Claims priority, application Great Britain April 29, 1955

4 Claims. (Cl. 178—5.4)

Figure 1:
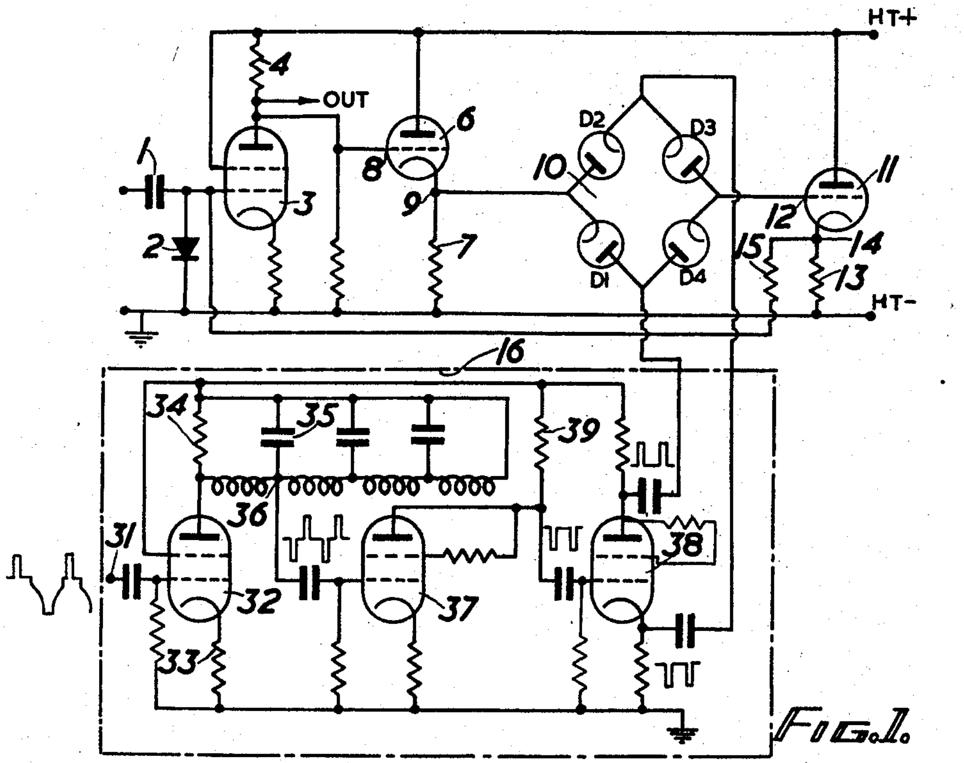

This invention relates to color television apparatus of the type in which chrominance information is contained on a sub-carrier and in which a synchronizing burst of sub-carrier frequency occurs during the intervals between the end of a synchronizing pulse and the commencement of the subsequent picture line. These chrominance synchronizing sub-carrier transmissions, known as "color bursts" and referred to as such hereinafter in this specification are commonly separated from the synchronizing signal by a very short interval of time and occur during the "black level" or "pedestal" period.

In television apparatus of this type, the retention of the D.C. component without unacceptable distortion of the waveform during the color bursts is difficult. This difficulty arises from the additional requirement, i.e. additional as compared to the requirements which arise in a monochrome television system, that the phase of the chrominance signals must be preserved within one or two degrees over the desired amplitude range of vision signals. The acceptable distortion in the color burst is, therefore, very small since it is used as a phase reference for all picture content of chrominance signals.

With a simple D.C. restorer as commonly employed in television apparatus it is practicable to maintain the black level in the composite television waveform with a constancy of approximately $\pm 4\%$ with change of picture signal from black to white for constant amplitude of synchronizing pulses. For many purposes, a black level clamping arrangement is preferred and this may be designed to stabilize the black level to within $\pm 1\%$. However, with color television systems of the type described, the known art teaches that if the sub-carrier constituting the color burst is present at a part of the apparatus in which the clamp is operative the black level clamping occurs during the transmission of the color burst and distortion of the sub-carrier waveform is produced unless the impedance of the clamping circuit is very high at the frequency of the chrominance synchronizing sub-carrier.

It is an object of the invention to clamp the black level of the television signal in an apparatus of the type described with the minimum distortion.

The invention is primarily intended for television transmitters for, in the case of transmission, the requirements as to high quality are, of course, very onerous. The invention is, however, not limited to its use in transmitters but may equally well be employed in receivers in cases in which the improved quality it provides warrants the cost of the extra apparatus necessary.

According to this invention a television apparatus of the type referred to comprises a valve, means for applying television signals as input to said valve, a D.C. restorer circuit connected to said valve, an electronic switch in a circuit fed with D.C. restored output signals from said valve, electronic means for closing said switch during clamping periods of the television signals, and means for feeding back as super-imposed input to said valve, voltage dependent on the output voltage level from said valve when said switch is closed.

Figure 2:
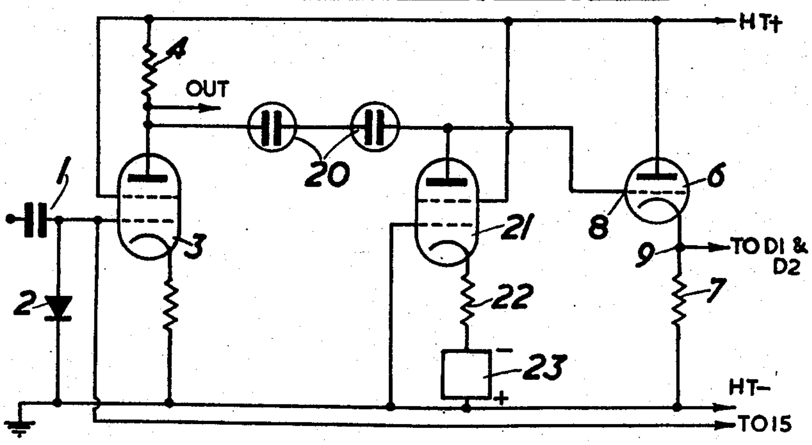

The invention is illustrated in the accompanying drawings in which Fig. 1 illustrates one embodiment of the invention and Fig. 2 illustrates an arrangement which is generally similar to that of Fig. 1, but differs therefrom in that it employs a neon coupler.

Referring to Fig. 1, a coupling condenser 1 is shown connected to the control grid of amplifier valve 3 which is in the main signal channel, and from whose anode output is taken at Out to the following circuits of the transmitter, not shown. Television signals including the color bursts, are applied through condenser 1 to valve 3. The loss of the D.C. component in the A.C. coupling through condenser 1 is partly restored by a normal D.C. restorer diode 2 connected between the grid of valve 3 and earth. However the D.C. restoration afforded by this simple arrangement is not complete and consequently the black level in the output television signal will vary within certain limits. With the simple diode D.C. restorer circuit illustrated, there is likely to be an error in the black level of $\pm 5\%$ for constant amplitude or synchronizing pulses, due to the averaging effect of condenser 1 on the composite television signal, unless supplementary D.C. restorer means are provided. The circuit arrangement hereinafter described serves to reduce this error to acceptable levels while retaining the simple diode D.C. restorer circuit illustrated in the direct path of the television signal.

The amplified television signal developed in the anode load 4 of valve 3 is applied to the control grid 8 of a valve 6 which is connected as a cathode follower. Across the cathode load resistance 7 of valve 6 is produced a voltage corresponding in waveform to that across anode resistance 4 of valve 3 but, of course, somewhat smaller in amplitude and containing all the D.C. information appearing at Out.

A clamping or gating bridge consisting of four diodes D1, D2, D3 and D4 is arranged between the cathode of valve 6 and the control grid 12 of valve 11. A clamping pulse generator shown within broken rectangle 16, applies negative pulses to the cathode of diodes D2, D3 and positive pulses to the anode of diodes D1, D4 during pre-determined intervals of time during the black level periods immediately following each line synchronizing pulse. During this pre-determined interval of time—the so-called clamping interval—the four diodes in the clamping or gating bridge become conductive and present a very low impedance between the cathode of valve 6 and the control grid of valve 11 and consequently the voltage of these two points becomes substantially equal during the clamping or gating interval.

The clamping or gating pulse generator shown at 16 is well known per se and is only an example of various known forms of generator which might be used. A composite television waveform consisting of negative-going vision signals and positive-going synchronizing pulses is applied at 31 to the input of the generator. Valve 32 is operated as a normal synchronizing signal separator with the cathode leg resistance 33 so dimensioned, in accordance with known principles, that the grid bias on the valve is such that the negative-going vision signals cut off the anode current of the valve, whereas the positive going synchronizing pulses render the valve conductive. Across the anode load resistor 34 are therefore developed pulses corresponding to the synchronizing pulses only.

A delay line 35 comprising lumped inductive and capacitative elements, is connected across load resistance 34 and is short circuited at its far end. It is so dimensioned that a negative going synchronizing pulse from resistance 34 passes along the line and is reflected back from the far end thereof so as to derive at resistance 34 a pre-determined period of time—say three microseconds later—and in opposite polarity to the original pulse. The result of adding the original and reflected pulses at resistance 34 is to produce two pulses of three microseconds duration, the leading edge of these pulses being synchronous with the leading and the trailing edges of the original synchronizing pulse across resistance 34. In practice a time interval of half a microsecond between the trailing edge of the outgoing synchronizing signal and the leading edge of the derived pulses of three microsecond duration is desirable. This additional small delay is obtained by taking the combined output pulse from a suitably chosen tapping point 36 on the delay line. These negative and positive pulses are applied to the control grid of valve 37 which is operated as a separator valve in a generally similar manner to valve 32 and so that the negative-going pulses cut off the anode current and the delayed positive-going pulses render the valve conductive.

Negative-going pulses corresponding to the positive going pulses at 36 are developed across load resistance 39 at instants occurring during the blanking period following the outgoing synchronizing pulse and these are applied to a phase splitter valve 38. Pulses of positive and negative polarity are taken from the anode and cathode respectively of valve 38 and applied to the clamping or gating bridge 10.

The voltage at the cathode 9 is used as the reference voltage for the clamping bridge 10 and thus, during the clamping interval when the clamping or gating bridge is conductive, grid 12 is brought to this reference voltage. During the periods between the clamping or gating pulses, the voltage at grid 12 remains substantially constant, because the bridge 10 is then open and the leakage of voltage from grid 12 is negligible. Any variation in black level in the television signal causes a change in voltage to appear at the reference point 9 and this is applied as an error correcting voltage to the grid 12 to control the anode current of valve 11 whereby an alteration in the D.C. voltage across cathode resistance 13 is developed in dependence upon the voltage at 9. This voltage is applied back to the control grid of valve 3 as negative feed back through resistance 15.

The operation of the system shown in Fig. 1 may be summarized as follows. The composite signal at cathode 9, which corresponds in waveform to that appearing at Out, contains a component resulting from the D.C. black level or pedestal in the television signal fed to condenser 1. The gating pulse generator 16, having the same input at 31, controls the operation of the gating bridge 10 at the proper times for sampling the black level component in the composite signal at 9. The level of the sample will remain the same under constant black level conditions. This level is taken as normal and the grid 12 remains normally at this level. Variations from this reference level affect the signal at 9 and appear as error correcting signals on the grid 12 which result in correction of the D.C. level at the control grid of valve 3, as described above. The timing of this correction being governed by gating pulses derived from the synchronizing pulses in the original television signal through generator 16, correction at the control grid of valve 3 takes place during the clamping interval so that the color burst and the subsequent picture line may pass undistorted through the path between the input to condenser 1 and Out, which is the effect sought in this invention. The impedance of the path from the input to condenser 1 to Out is substantially constant, with all factors fixed except for the correction voltage applied to the grid of valve 3. This correction voltage is only a small proportion of the voltage actually at the grid fo valve 3 and does not materially affect the input or output impedance. The removal from the path between input and output of active circuit elements capable of adversely affecting the impedance of the path is one of the principal features of this invention, and the resulting substantially constant impedance, with adequate D.C. restoral, permits the undistorted transmission of the composite color television signal through the amplifier valve 3.

If desired, A.C. coupling can be employed between valve 3 and the grid 8. This is practicable provided the time constant of the coupling circuit is large compared with any signal component or unwanted variation.

It will be seen that this method of correcting for any variations in black level does not introduce any undesired variable impedance into the main signal path of which amplifier valve 3 forms a part. This is of great importance in color television systems, because of the necessity to avoid phase changes in the signal channel and distortion of the color bursts. At the input of the amplifier constituted by valve 3, which is in the main transmitter channel, the impedance is constant throughout the color burst. Therefore, during the clamping period feedback is provided from the valve 11 which is dependent upon the black level value in the back-porch period following the synchronizing signal. It is important that the impedance must not vary during the color burst. The reduced distortion at the color burst is due to the provision of the constant impedance at the input of valve 3 during the clamping period.

The order of reduction in error achievable by the use of this invention is typified as follows: Assuming a gain of A in valve 3, and the gain of each of valves 6 and 11 to be 0.9, an alteration in black level of 1 volt at the grid of valve 3 will produce A volts at the anode of this valve, 0.9A volts at the cathode 9 and 0.8A at the cathode 14. Thus the variation in black level is reduced by a factor of approximately 0.8A and if, as is quite practicable, A is equal to 10, a reduction of four fifths is achieved in black level instability. In this manner, the original error in black level of 5 percent is reduced to 1 percent.

In Fig. 2 is shown a diagram of an alternative method of coupling the signal from the valve 3 to the valve 6. The parts of this diagram that are similar to parts in Fig. 1 are indicated by like reference numbers.

Referring to Fig. 2, the anode of valve 3 is connected to earth through a potential divider network consisting of gas discharge tubes 20, a valve 21 and its biasing resistance 22 and a battery or other potential source 23. The lead to the grid 8 of valve 6 is taken from the anode of valve 21 and the battery 23 is connected to apply a negative voltage to the cathode of valve 6 with respect to the cathode of valve 21. In the operation of this arrangement the gas discharge tubes have a very high D.C. resistance and the valve 21 has a low D.C. resistance. Consequently only a very small D.C. voltage due to this coupling circuit is applied to the grid of valve 6. In respect of A.C. voltages, the gas discharge tubes present a very low impedance and the valve presents a very high impedance. Therefore a very large proportion of any A.C. voltage at the anode of valve 3 is applied to the grid 8, and since this A.C. voltage includes the error voltage, the maximum transfer of the latter is provided.

The feedback loop comprising valves 6, D1, D2, D3, D4, and 11 may of course contain a further system of D.C. amplification. Since the overall improvement of black level stability is proportional to the gain in the loop as already explained, a further stage of D.C. amplification may be useful in some cases. This further stage of D.C. amplification can be inserted anywhere between "out" and the grid 12 of valve 11.

In both Figs. 1 and 2 the input applied to the terminals indicated to the left of the D.C. restorer 2, and condenser 1, are the full vision signals and synchronizing pulses, i.e. the full television waveform. The same input is applied to the terminal 31 and thence to the input of the separator valve 32.

The feedback arrangement enables the derived voltage to be superimposed on the input to the D.C. restored valve 3. The network 35 from the input to condenser 1 to Out at the anode of valve 3 constitutes a constant impedance which does not vary, in any way to sensibly distort the full television waveform, over the whole of the pedestal period between the trailing edge of the synchronizing pulse and the following line of color intelligence. For this purpose the reference voltage is produced and by means of the diode gate an error correcting voltage is developed across the resistor 13 for application to the input of the valve 3, whereby the constant impedance is maintained.

In Figs. 1 and 2 the bias voltages for various electrodes are only shown where they have particular significance. In all other cases, bias voltage sources (not shown) are provided and adjusted in accordance with normal well known practice.

I claim:

1. In a color television apparatus of the type in which chrominance information is contained on a sub-carrier and in which a synchronizing burst of sub-carrier frequency occurs during the intervals between the end of a synchronizing pulse and the commencement of the subsequent picture line, a main transmitter channel, a valve in said main transmitter channel, condenser means for applying television signals as input to said valve, means for delivering television signals at the output of said valve, a single diode D.C. restorer circuit connected at the input to said valve, a cathode follower fed from said valve, an electronic switch fed with D.C. restored signals from said cathode follower, electronic means for closing said switch during clamping periods of the television signals, a further valve including a control grid, means to connect said control grid to said electronic switch, means to feed back as superimposed input to said first mentioned valve, a voltage dependent upon the input on the control grid of said further valve when said electronic switch is closed, for substantially restoring the D.C. component of said television signals while maintaining a substantially constant impedance between said signal input and output means.

2. A television apparatus as set forth in claim 1 wherein said cathode follower is fed from said valve through means including a potential divider comprising at least one gas discharge tube fed from said valve and connected in series with a third valve, said tube and said third valve being operated to present, respectively, high and low D.C. resistance and, also respectively, low and high A.C. resistance, and wherein the output from said third valve to said cathode follower and thence to said electronic switch is derived from a point in the divider between said tube and said third valve.

3. A television apparatus as set forth in claim 1 wherein said electronic switch comprises four unilaterally conductive devices connected in a bridge with input and output points at the ends of one diagonal thereof, a gating pulse generator having the same television signals as input and deriving gating pulses from the synchronizing pulses therein, said switch being opened and closed by control potentials on the gating pulses derived in said generator and fed to the ends of the other diagonal of said bridge.

4. A television apparatus as set forth in claim 1 wherein said electronic means for closing said electronic switch comprise a gating pulse generator having the same television signals as input and deriving gating pulses from the synchronizing pulses therein for closing said switch to feed back voltage to the input of said first mentioned valve before the commencement of the subsequent picture line.

References Cited in the file of this patent

UNITED STATES PATENTS

| | | |
|---|---|---|
| 2,307,375 | Blumlein et al. | Jan. 5, 1943 |
| 2,363,800 | Moffett | Nov. 28, 1944 |
| 2,666,136 | Carpenter | Jan. 12, 1954 |
| 2,792,496 | Rhodes | May 14, 1957 |